(12) United States Patent
Mulligan

(10) Patent No.: US 11,549,370 B2
(45) Date of Patent: *Jan. 10, 2023

(54) SYSTEMS AND METHODS FOR A PISTON ENGINE INCLUDING A RECIRCULATING SYSTEM USING SUPERCRITICAL CARBON DIOXIDE

(71) Applicant: Karl Peter Mulligan, El Cerrito, CA (US)

(72) Inventor: Karl Peter Mulligan, El Cerrito, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/219,645

(22) Filed: Mar. 31, 2021

(65) Prior Publication Data

US 2021/0215045 A1 Jul. 15, 2021

Related U.S. Application Data

(63) Continuation of application No. 17/005,098, filed on Aug. 27, 2020, now Pat. No. 10,975,697.

(60) Provisional application No. 62/896,441, filed on Sep. 5, 2019.

(51) Int. Cl.
*F01B 9/02* (2006.01)
*F01K 25/10* (2006.01)
*F01B 31/28* (2006.01)
*F01K 25/00* (2006.01)

(52) U.S. Cl.
CPC ............. *F01B 9/02* (2013.01); *F01B 31/28* (2013.01); *F01K 25/00* (2013.01); *F01K 25/103* (2013.01); *F01B 2250/001* (2013.01)

(58) Field of Classification Search
CPC ...... F01B 9/02; F01B 31/28; F01B 2250/001; F01K 25/00; F01K 25/103; F01K 7/32; Y02T 10/12; F02B 47/08
USPC .................................................... 60/650, 682
See application file for complete search history.

(56) References Cited

U.S. PATENT DOCUMENTS

| | | | | | |
|---|---|---|---|---|---|
| 2,791,881 | A | * | 5/1957 | Denker | ..................... F02G 5/04 60/619 |
| 3,708,979 | A | * | 1/1973 | Bush | ....................... F02G 1/043 60/522 |
| 4,565,167 | A | * | 1/1986 | Bryant | .................... F02B 33/22 123/560 |
| 5,265,564 | A | * | 11/1993 | Dullaway | ............... F02B 33/22 123/560 |

(Continued)

*Primary Examiner* — Hoang M Nguyen

(57) ABSTRACT

In some embodiments the disclosure is directed to a closed-loop piston engine system using a recirculating carbon dioxide ($CO_2$) system with supercritical carbon dioxide ($scCO_2$) as a working fluid. The closed-loop piston engine system may include a $scCO_2$ injector; a superheating nozzle region; a first valve; a second valve; a piston moving in the cylinder and coupled with a crankshaft, the piston being driven toward a centerline of the crankshaft during a power stroke using a connecting rod and causing the crankshaft to rotate thereby causing one power stroke per piston per crankshaft rotation and thereby producing two power strokes for every single power stroke that a similar engine would produce if run as a hydrocarbon fuel powered internal combustion engine. The recirculating $CO_2$ system recirculates the used carbon dioxide and there are no carbon dioxide emissions from the system.

15 Claims, 6 Drawing Sheets

(56) References Cited

U.S. PATENT DOCUMENTS

| 6,095,100 A * | 8/2000 | Hughes | F02B 41/00 |
| | | | 123/25 C |
| 10,975,697 B2 * | 4/2021 | Mulligan | F01K 25/103 |

* cited by examiner

SYSTEMS AND METHODS FOR A PISTON ENGINE INCLUDING A RECIRCULATING SYSTEM USING SUPERCRITICAL CARBON DIOXIDE

CROSS REFERENCE TO RELATED APPLICATION

This patent application is a continuation of, and claims domestic benefit of, U.S. patent application Ser. No. 17/005,098, filed Aug. 27, 2020, entitled "Systems and Methods for a Piston Engine Including a Recirculating System Using Supercritical Carbon Dioxide," which claims the domestic benefit of U.S. Provisional Patent Application Ser. No. 62/896,441 filed on Sep. 5, 2019 and titled "Systems and Methods for a Piston Engine Including a Recirculating System Using Supercritical Carbon Dioxide." All of the aforementioned disclosures are hereby incorporated by reference herein in their entireties including all references and appendices cited therein.

FIELD OF TECHNOLOGY

Embodiments of the present disclosure are directed a piston engine including a recirculating system using supercritical carbon dioxide ($scCO_2$). In various embodiments the present technology uses $scCO_2$ as the working fluid.

SUMMARY

According to some embodiments, the present technology is directed to a closed-loop piston engine system using a recirculating carbon dioxide ($CO_2$) system with supercritical carbon dioxide ($scCO_2$) as a working fluid. In some embodiments the closed-loop piston engine system includes (i) a $scCO_2$ injector for injecting $scCO_2$ into a cylinder; (ii) a superheating nozzle region for imparting heat into the injected $scCO_2$; (iii) a first valve of a cylinder head of the cylinder, the first valve being fluidly coupled with the recirculating carbon dioxide ($CO_2$) system; (iv) a second valve of the cylinder head of the cylinder, the second valve being fluidly coupled with the recirculating carbon dioxide ($CO_2$) system; and (v) a piston moving in the cylinder and coupled with a crankshaft, the piston being driven toward a centerline of the crankshaft during a power stroke using a connecting rod and causing the crankshaft to rotate thereby causing one power stroke per crankshaft rotation and thereby producing two power strokes for every single power stroke that a similar engine would produce if run as a hydrocarbon fuel powered internal combustion engine. In some embodiments the recirculating carbon dioxide ($CO_2$) system includes (a) a valve system fluidly coupled with the first valve of the cylinder head and the second valve of the cylinder head for collecting used carbon dioxide; (b) a $CO_2$ storage tank receiving the used carbon dioxide via the valve system; (c) a high-pressure gas booster fluidly coupled to the $CO_2$ storage tank for pressurizing the used carbon dioxide to a supercritical state producing $scCO_2$; and (d) a working fluid rail fluidly connecting the $scCO_2$ to the $scCO_2$ injector.

In various embodiments the recirculating carbon dioxide ($CO_2$) system recirculates the used carbon dioxide and there are no carbon dioxide emissions from the closed-loop piston engine system.

In various embodiments of the present technology carbon dioxide in a supercritical state ($scCO_2$) is a recirculating working fluid. The $scCO_2$ may be directly injected into the cylinder of the piston engine through a heated direct injector. Instead of combustion, the $scCO_2$ expands very rapidly by the heat which drives the pistons. The pistons then rotate a crankshaft, as in an internal combustion engine. Expanded gases are exhausted on each piston up stroke through a re-timed valve system, and a power stroke occurs each time a piston, whether individually or paired, is at or about Top Dead Center (TDC) and on the down stroke. There is neither an Intake-stroke, nor a Compression-stroke, resulting in these piston engines of the present technology operating as a two-stroke in a closed-loop, rather than a four-stroke open (to atmosphere) internal combustion engine system. Significantly, even number cylinder engines having pistons reciprocating in pairs, benefit from the two-stroke embodiment by having both pistons in each pair, on the power stroke at the same time. This is unlike a four-stroke where only one of the pistons (in the pair) is on the power stroke, while the other is on the intake stroke, and not producing power. Furthermore, the lower-pressure $CO_2$ may then be circulated and stored in a tank. A high-pressure gas booster may pump the gas to $scCO_2$ state and the $scCO_2$ is then used again to drive the piston engine.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DESCRIPTION OF EXEMPLARY EMBODIMENTS

Figure 1A:
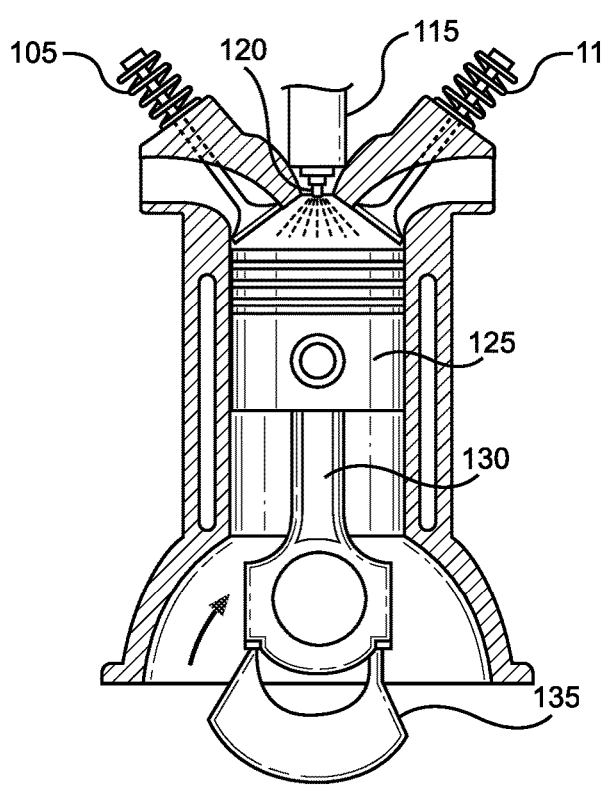
FIG. 1A is an illustration of an exemplary single piston at top dead center (TDC) according to various embodiments of the present technology.

Embodiments of the present technology are directed to a piston engine including a recirculating system using supercritical carbon dioxide ($scCO_2$). Various embodiments relate to piston engines, $scCO_2$, closed-loop Rankine cycle (not shown), power generation, and thermodynamics. For example, the gas expansion characteristics of $scCO_2$ are utilized in a closed-loop similar to the Rankine steam cycle, and heated by an external source, to drive a piston engine so as to rotate a crankshaft. The Rankine cycle uses a working fluid (e.g., water) in a closed-loop setup and introduces heat to cause the fluid to expand in the form of steam, and uses this expanding gas (i.e., steam) to produce work. Various embodiments of the present technology use $scCO_2$ as the working fluid.

Sandia Labs has been developing prototypes of Brayton cycle systems using $scCO_2$, which is heated and used to drive a turbine attached to a generator via a transmission (not shown). Primary attention by investigators is to use industrial waste heat, or heat from nuclear reactors to heat the $scCO_2$ prior to being introduced into the turbine. By using high pressure heat exchangers, in a cascading multiple turbine set-up, very high levels of power and efficiency are produced in a small physical footprint. Significant potential power is stored within compressed $CO_2$, particularly when under optimal conditions such as when in a supercritical state. When $scCO_2$ is expanded through an orifice, $scCO_2$ expands rapidly, and this rapid gas expansion is used to effect (produce) work. Furthermore, if the region immediately surrounding this orifice is very hot (e.g., 500° C. to 800° C.), (the first law of thermodynamics, indicates that the more heat put into the gas, the greater potential work output from the gas), the gas expands at a tremendous rate.

If this supercritical fluid is injected into an appropriately modified Internal Combustion Engine (ICE) via a diesel direct injector (or similar), via the former spark plug hole location of a gasoline ICE, it may be used to drive the piston(s) and thereby rotate a crankshaft. After providing useful work, the gases expand further and cool sufficiently in an application specific recuperating system, where they are again compressed, stored, and made available for the gas booster to bring the $CO_2$ to the suitable injection pressure, commensurate with the demand made on the engine by the operator via some form of power commanding device, like a "gas pedal".

The internal combustion engine (ICE) has been commercially available to the public for more than one-hundred-and-twenty-five years in various forms, and the mechanics are well conceived. Much time, money, human ingenuity and effort has rendered this technology commonplace with many hundreds of millions of ICE's currently functioning. Improvements and innovations are routinely and regularly implemented to increase efficiency, improve functionality, and reduce emissions.

Embodiments of the present technology contribute to this effort by providing a means by which such ICE's can be modified to eliminate combustion altogether, and replace that resulting force of combustion (of an ignited air/fuel mixture), with the gas expansion force provided by injecting $scCO_2$ through a superheated nozzle region directly into a closed cylinder head filling the "clearance volume" (the former "combustion chamber") in order to drive the piston toward the crankshaft centerline, and rotate the crankshaft.

In various embodiments the present technology includes a piston engine which uses supercritical carbon dioxide ($scCO_2$) as the working fluid in a recirculating (closed-loop) system. For example, instead of burning an air/fuel mixture to expand gases, so as to increase the pressure in a cylinder and drive a piston, the $scCO_2$ is introduced into the clearance volume (the former combustion chamber) via a direct injector through a very hot (superheating) expanding (flared) nozzle. The very hot $scCO_2$ expands rapidly in the cylinder, resulting in the driving of the piston in the same manner as realized by the burning of the previously used air/fuel mixture. The valve train is reconfigured so as to facilitate the use of both the original intake, as well as the original exhaust both as exhaust systems. The expanded gases, after having been used to drive the piston, are directed through the exhausts to a recuperation system where the $CO_2$ is cooled, then once again compressed and heated to $scCO_2$ conditions before being re-introduced via the direct injectors into the cylinders, completing the circuit.

In some embodiments in order to construct this closed-loop $scCO_2$ powered recirculating engine system, one knowledgeable in the art comprehends the action of a one cylinder, one piston, one injector, one exhaust port version of this engine, so as to enable the same theory or concept to be applied to multi-cylinder applications.

In a simplified example of some embodiments, a working fluid, $scCO_2$, is injected directly into a cylinder at or about when the piston is at top-dead-center (TDC), and the exhaust valve is closed. The piston is driven toward the crankshaft centerline (down stroke) by the expanding gases, causing the rotation of the crankshaft. At or about when the piston is at bottom-dead-center (BDC), the exhaust valve opens, thereby venting the expanding gases out the exhaust system on the piston upstroke. This cycle repeats when the piston is at or about TDC. Many different gases can be used to drive a piston, including steam, compressed air, other supercritical fluids, and the like, but $scCO_2$ is chosen as a principal component in some embodiments because of the non-toxic, non-explosive, cheap and plentiful nature of $scCO_2$, besides the useful and powerful gas expansion characteristics of $scCO_2$.

In various embodiments carbon dioxide constrained under supercritical conditions is introduced into a closed cylinder via the direct injector and flows past a superheated region, and into what used to be the combustion chamber, but since no air/fuel mixture is being burned there is no combustion in the system. This chamber, the space in a cylinder between the piston at top dead center (TDC) and the cylinder head, with all valves closed, is referenced as the "Clearance Volume" (CV).

In various embodiments a sequence of operation of a single cylinder is shown from FIG. 1A to FIG. 1B to FIG. 1C to FIG. 1D as described below. Furthermore, a sequence of operation of two pairs of pistons functioning together by reciprocating in a linear oscillating manner in pairs is shown from FIG. 2A to FIG. 2B to FIG. 2C to FIG. 2D as described below.

In various embodiments a sequence of operation is as follows below. First, $scCO_2$ is introduced into the closed cylinder via a heated direct injector (e.g., injector 115 of FIG. 1A and FIG. 1C). The heated direct injector may be located in what used to be the spark plug hole location of a gasoline ICE or similarly, the direct injector location of a diesel ICE.

Figure 1B:
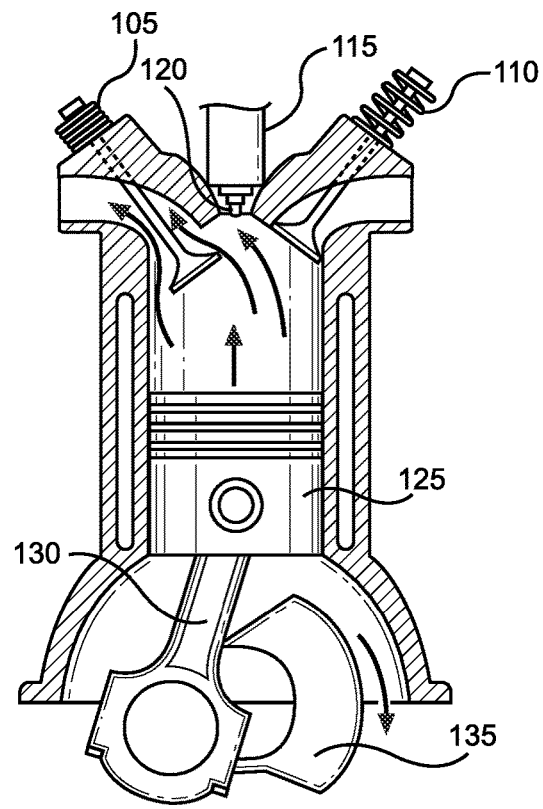
FIG. 1B is an illustration of an exemplary single piston at bottom dead center (BDC) according to various embodiments of the present technology.
Figure 1C:
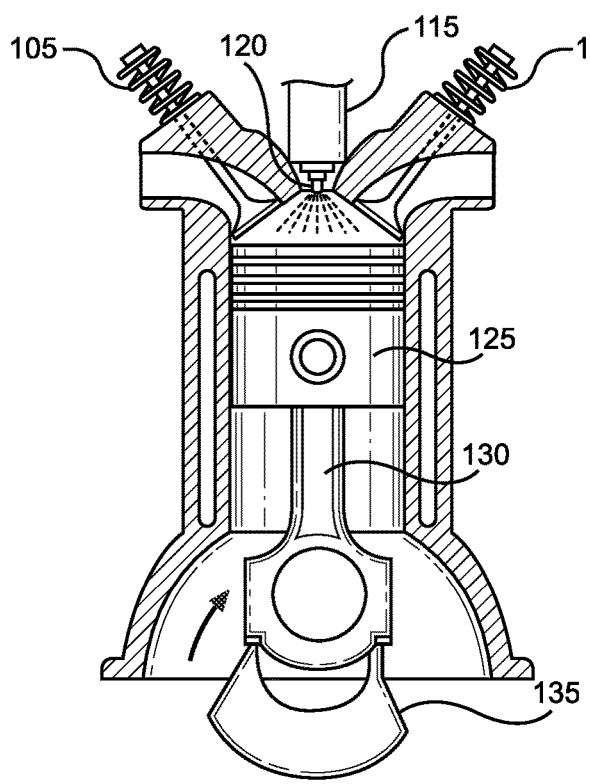
FIG. 1C is an illustration of an exemplary single piston at top dead center (TDC) according to various embodiments of the present technology.

Second, in some embodiments the gas ($scCO_2$) expands rapidly through the flared heated nozzle region (e.g., nozzle region 120 of FIG. 1A and FIG. 1C). The nozzle region may be a point as shown in nozzle region 120 of FIG. 1A and FIG. 1C or may be a broader region in various embodiments.

Figure 2A:
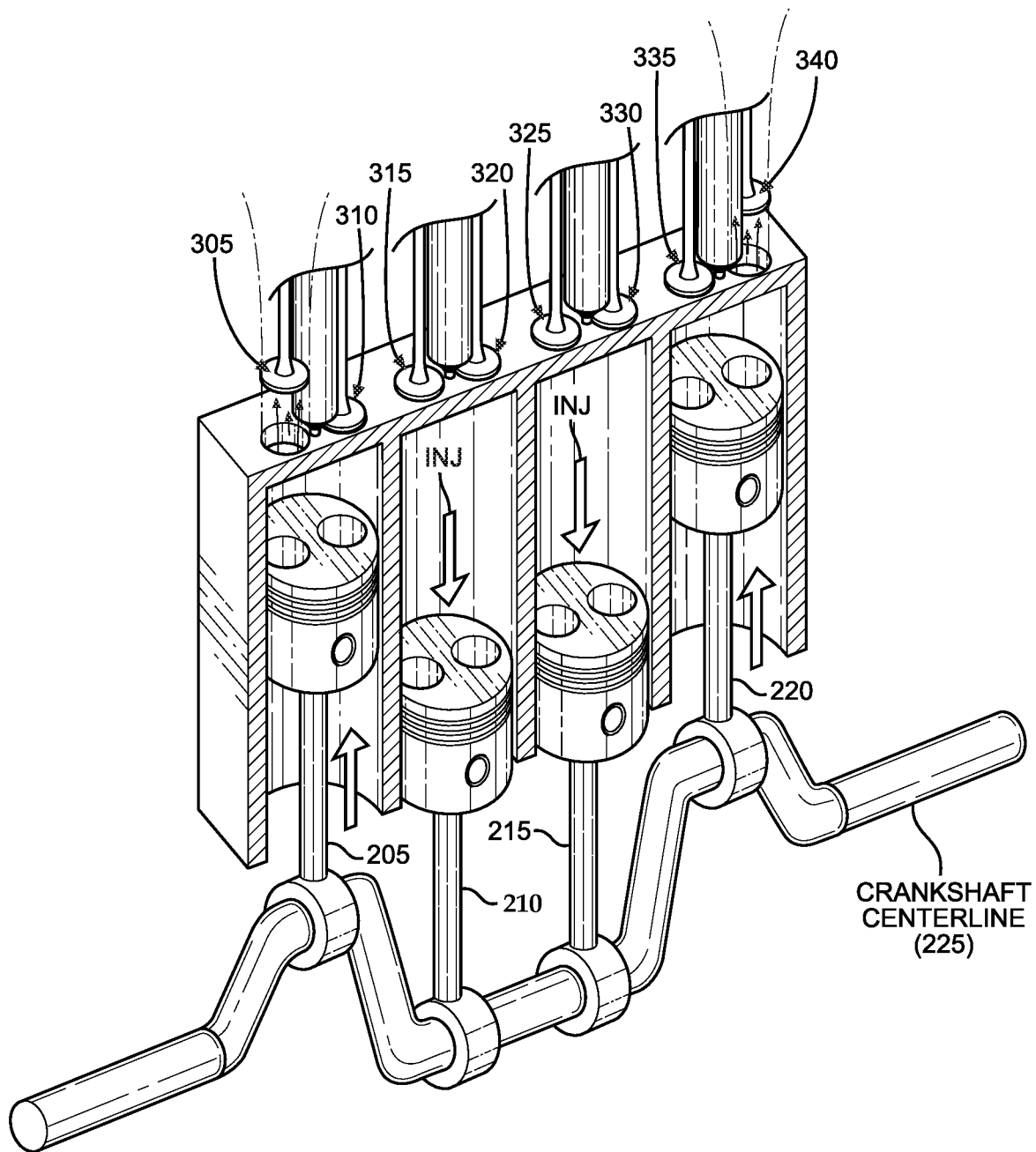
FIG. 2A is an illustration of exemplary pistons reciprocating in a linear oscillating manner in pairs according to various embodiments of the present technology.
Figure 2B:
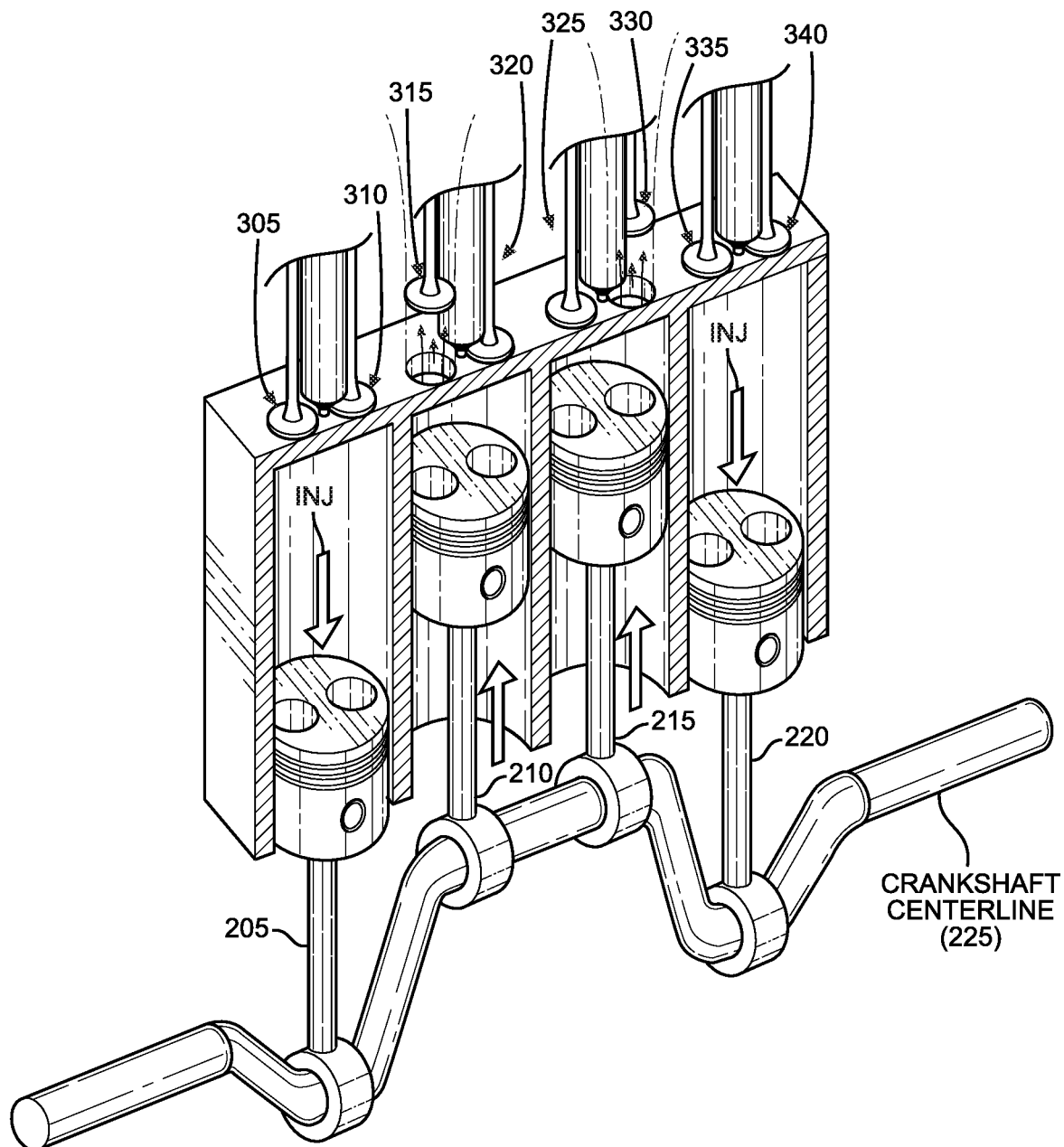
FIG. 2B is another illustration of exemplary pistons reciprocating in a linear oscillating manner in pairs according to various embodiments of the present technology.
Figure 2C:
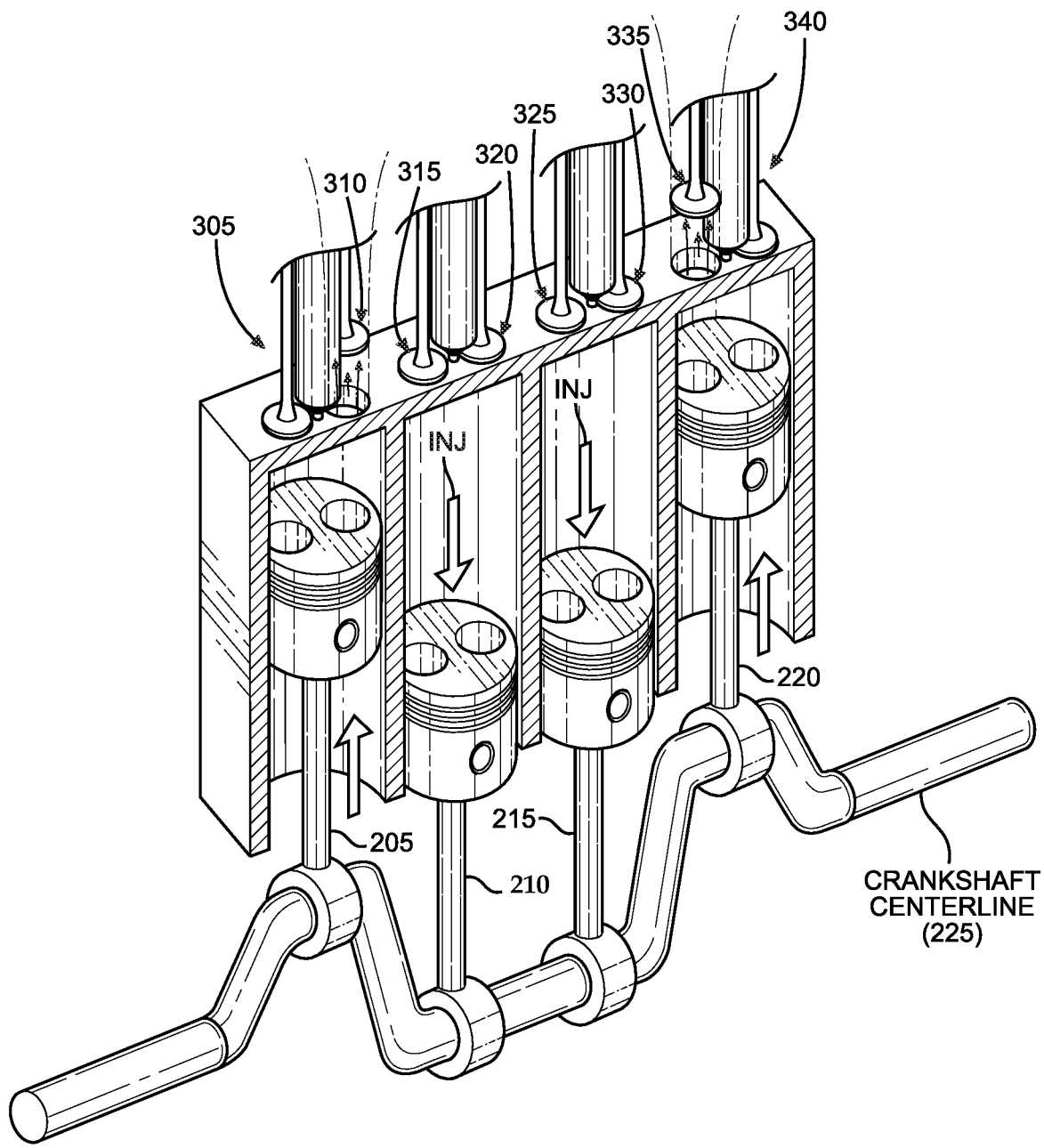
FIG. 2C is an illustration of exemplary pistons reciprocating in a linear oscillating manner in pairs according to various embodiments of the present technology.
Figure 2D:
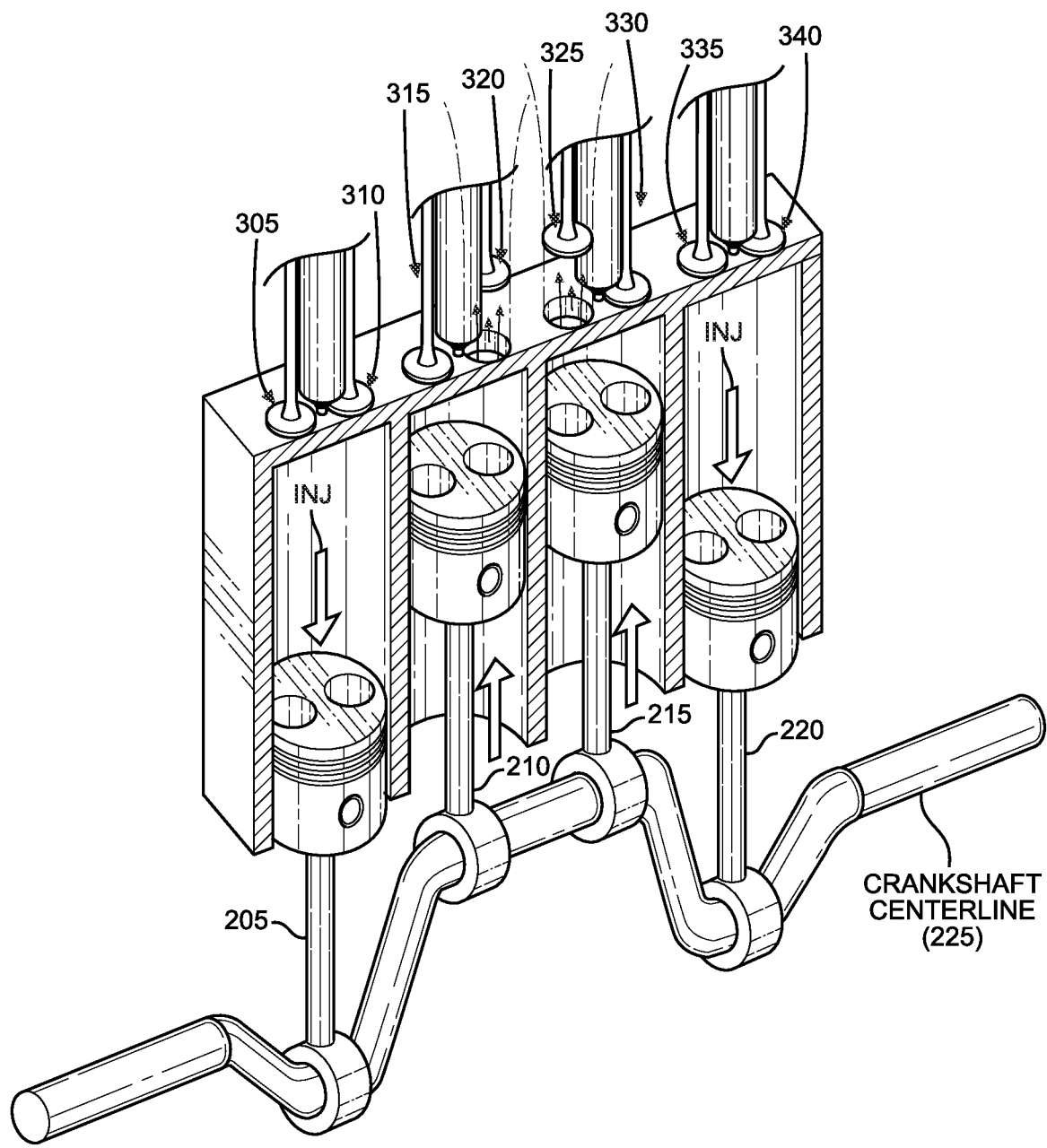
FIG. 2D is another illustration of exemplary pistons reciprocating in a linear oscillating manner in pairs according to various embodiments of the present technology.

Third, in various embodiments the very hot expanding gas ($scCO_2$) drives the piston toward the crankshaft centerline (e.g., crankshaft centerline 225 of FIG. 2A and FIG. 2D).

Figure 1D:
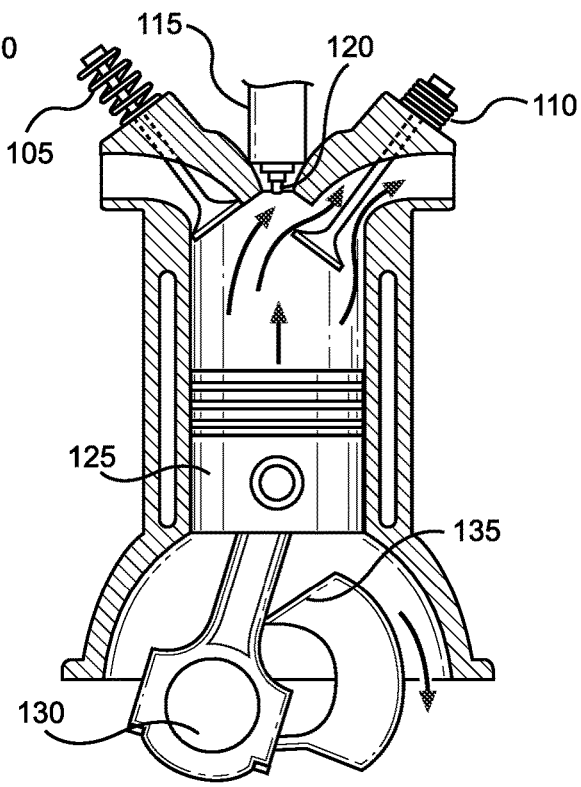
FIG. 1D is an illustration of an exemplary single piston at bottom dead center (BDC) according to various embodiments of the present technology.

Fourth, in some embodiments when the piston is in the region of Bottom Dead Center (BDC) (e.g., as shown in FIG. 1B and FIG. 1D), either the original intake valve, or the original exhaust valve opens to vent the spent gases. On the next stroke the opposite valve vents.

Fifth, in various embodiments, when the piston is returned to the TDC (e.g., as shown in FIG. 1A and FIG. 1C), another injection of hot gases ($scCO_2$) is introduced, repeating the cycle, and so forth. Additionally, this two-stroke engine is accomplished in a multi-cylinder application as exemplified in FIG. 2A to FIG. 2B to FIG. 2C to FIG. 2D below.

Most common even number cylinder engines are designed, for balance purposes, to have pairs of pistons working in unison. For example, according to embodiments of the present technology a sequence of operation of two pairs of pistons functioning together by reciprocating in a linear oscillating manner in pairs is shown from FIG. 2A to FIG. 2B to FIG. 2C to FIG. 2D as described below.

In a four-stroke engine, only one of those pistons in the pair is on the power stroke, while the other piston in the pair is on the intake stroke, producing no power. The other piston is actually reducing power through reciprocating losses such as friction.

In various embodiments of the present technology, the four-stroke valve train is reconfigured to run as a two-stroke, with both pistons in the pair on the power stroke at the same time as shown in the sequence of operation of two pairs of pistons functioning together by reciprocating in a linear oscillating manner in pairs is shown from FIG. 2A to FIG. 2B to FIG. 2C to FIG. 2D as described below. Each time a pair of pistons are at TDC they each (simultaneously) receive an injection of $scCO_2$, driving both pistons in the pair toward the crankshaft centerline. On the upstroke (the exhaust stroke) one of these cylinders uses the former intake valve system to vent, while the other in the pair uses the original exhaust valve system. On the next stroke the opposite valve system opens.

In various embodiment of the present technology, this new valve train timing is accomplished with appropriate camshaft profiles. For example, new camshafts are ground (i.e., produced) for pushrod motors using a single camshaft, but for dual overhead cam (in the case of in line four cylinder and inline six cylinder) designs with independent intake and exhaust camshafts, or in quad cam designs, are used in V engines (also commonly called Vee engines) (e.g., V6, V8, V12), the intake and exhaust camshafts may be rotated independently of one another so as to cause on each up stroke, either exhaust one (the old intake) or exhaust two (the original exhaust) to open. The opposite (relative) valve opens on the second cylinder of the pair as shown in the exemplary sequence of operation of two pairs of pistons functioning together by reciprocating in a linear oscillating manner in pairs is shown from FIG. 2A to FIG. 2B to FIG. 2C to FIG. 2D as described below. Furthermore, as previously stated, on the next rotation, the other camshaft operates the other valves.

In various embodiments, camshafts are replaced with individually controlled valves that may be pneumatic, piezoelectric, solenoid, and the like, or controlled by other mechanisms (not shown).

In various embodiments, exhaust of an ICE must withstand pressures commensurate with the exhaust gas pressures produced in an ICE, and if this described embodiment retains the approximate maximum cylinder pressure, there may be a suitably strong (capable) exhaust two. The previous intake (i.e., "exhaust one") needs to be extensively reworked in this embodiment. The intake (i.e., "exhaust one") is generally not capable of the same pressures as the exhaust, but if a stronger exhaust one is built with similar capabilities to exhaust two, exhaust one may be made sufficiently strong to satisfy the exhaust one gas pressures.

In various embodiments the two exhaust systems are joined together downstream (not shown), where the gases cool and condense, are re-pressurized and pre-heated prior to being repeatedly introduced into the cylinders as a superhot, extremely rapidly expanding gas, through the direct injector and heating element, starting the cycle over. In various embodiments of every application, the exhaust system must be designed to suitably cool the utilized spent gases in preparation for recompression and may incorporate radiators and heat exchangers as would be suitable for the use and running environment. For example, a boat using this system, would have more available cooling capacity in the surrounding water, than would this system powering a generator in the desert, and both would use different "application suitable" cooling and heating systems (not shown) specific for the environment.

In some embodiments, with the exhaust gases sufficiently cooled and the pressure significantly reduced, a large capacity, relatively low pressure $CO_2$ pump (shown as low pressure $CO_2$ pump 435 in FIG. 3) transfers either gaseous or liquid (temperature and pressure dependent) $CO_2$ into a storage tank, in some instances similar to the tanks used in Compressed Natural Gas (CNG) vehicles, at up to about 4000 Pounds per Square Inch (PSI). A high-pressure gas booster (shown as high-pressure gas booster 450 in FIG. 3) or other suitable pump capable of compressing $scCO_2$ up to 20,000 PSI or more, may source from this tank in various embodiments. The region of the pre-injection common rail, located between the tank and injectors, preheats the $scCO_2$ as much as materials and injector designs allow. In various embodiments, the hotter, the better. These preheated gases (e.g., $scCO_2$) are injected through a suitably designed direct injector with an integrated heater at its point of injection (not shown). For example, the heater may be integrated between a point of $scCO_2$ injection, and a face of the piston (not shown). The heater may be an electric spark, plasma, electric ceramic, and the like, capable of saturating, with as much heat as possible, the injected stream(s) of $scCO_2$ as these gases are injected into the Clearance Volume (CV).

In various embodiments, since the present technology is not an ICE, and no combustion takes place, there is no need or use for a regular spark plug used in a gasoline ICE. Piezoelectric type direct injectors are generally of an appropriate size and shape that they can be fit to a variety of engines, in place of the spark plugs, and numerous patents have been issued for combination injector/spark plug inventions, which may effectively be what is necessary in some embodiments, although the fuel is substituted with a recirculating working fluid, in this case $scCO_2$. In various embodiments each engine using the present technology, is optimized with custom injectors. Optimal firing end temperatures of modern spark plugs used in a gasoline ICE are in the range of 500 to 800° C. These temperatures may prove sufficient to expand the injected $scCO_2$ to current typical ICE maximum cylinder pressures of about 1500 psi provided adequate volume per unit time, of $scCO_2$ can be injected to produce such pressures. In various embodiments, the three primary manipulators of the available Maximum Effective Cylinder Pressure (MECP) are first $scCO_2$ pre-injection pressure and temperature at the common working fluid rail, second flow rate of the injector, and third the amount of heat that can be saturated (imparted) into the injected $scCO_2$. Increasing the value of any of three primary manipulators of the available MECP, increases the MECP. These variables can be manipulated and are appropriately balanced for each application.

In various embodiments of the present technology injectors are suitably timed such that the directly injected hot gases ($scCO_2$) are introduced into the engine when the pistons (pair of pistons in an engine with an even number of cylinders) are near or at TDC. The most advantageous injection timing causes maximum force to the piston and therefore maximum torque to the crankshaft, advancing the rotation of the crankshaft in the desired direction. In contrast, an incorrectly timed injector, for example, one injecting significantly prior to the piston arriving at TDC, causes the hot injected gases ($scCO_2$) to expand in the cylinder while the piston is on its way up and one valve or a plurality of valves are still open. The hot gases rapidly expand and cool in the exhaust system providing no work on the piston in the desired manner, and having a retarding effect on the motor due to backpressure. Moreover, completely incorrect $scCO_2$ injection timing renders the engine inoperable.

In various embodiments any time any piston is at TDC an injection of hot gases is introduced into the CV, which expands rapidly and drives the piston. The spent gases are removed from the cylinder via the exhaust valves. In an effort to balance the exhaust system from over pressure or detrimental pressure pulses, the original intake valve(s), and exhaust valve(s) may vent in an alternating fashion on each up stroke (the exhaust stroke). For example, the sequence is as follows (as shown in from FIG. 1A to FIG. 1B to FIG. 1C to FIG. 1D showing a sequence of operation of a single cylinder and FIG. 2A to FIG. 2B to FIG. 2C to FIG. 2D showing a sequence of operation of two pairs of pistons functioning together by reciprocating in a linear oscillating manner in pairs) as described below. The present technology does not preclude all valves of a cylinder head (e.g., original intake valve(s), and exhaust valve(s)) from opening at the same time if the valves do not interfere with one another by design, thereby supplanting the alternating fashion of valve action described herein, resulting in greater potential exhaust flow.

FIG. 1A through FIG. 1D show a sequence of operation of a single cylinder for any number cylinder engine according to various embodiments. In various embodiments the operation of any single cylinder in a piston engine is shown in FIG. 1A to FIG. 1B to FIG. 1C to FIG. 1D. For example, the piston cycle repeats from FIG. 1A to FIG. 1B to FIG. 1C to FIG. 1D and again to FIG. 1A to FIG. 1B to FIG. 1C to FIG. 1D, and so forth.

FIG. 1A is an illustration of an exemplary single piston 125 at top dead center (TDC) according to various embodiments of the present technology. FIG. 1A shows the exemplary single piston 125 that is located at TDC with exhaust valve 105 and exhaust valve 110 closed. Furthermore, $scCO_2$ is injected via injector 115 and spontaneous superheating occurs at nozzle region 120. In various embodiments nozzle region 120 may be an entire region beyond injector 115, where intense heat is imparted into the $scCO_2$, and may include any part of, or entirety of the Clearance Volume (CV) that may be the former combustion chamber.

FIG. 1A further shows the single piston 125 being driven toward a centerline of a crankshaft using connecting rod 130 that transmits (i.e., transfers) linear force into rotational torque as connecting rod 130 causes the crankshaft 135 to rotate in a clockwise direction (as shown by the direction arrow).

FIG. 1B is an illustration of the exemplary single piston 125 at bottom dead center (BDC) according to various embodiments of the present technology. FIG. 1B shows the exemplary single piston 125 at BDC with exhaust valve 105 open. Exhaust valve 105 remains open until the single piston 125 reaches approximately TDC with venting of spent $CO_2$ out of exhaust valve 105 that is open.

FIG. 1C is an illustration of the exemplary single piston 125 at top dead center (TDC) according to various embodiments of the present technology. FIG. 1C shows single piston 125 at TDC again with exhaust valve 105 and exhaust valve 110 closed. Again, $scCO_2$ is injected via injector 115 and spontaneous superheating occurs at nozzle region 120. FIG. 1C further shows the single piston 125 being driven toward the centerline of the crankshaft using the connecting rod 130 that transmits (i.e., transfers) linear force into rotational torque as the connecting rod 130 causes the crankshaft 135 to rotate in a clockwise direction (as shown by the direction arrow).

FIG. 1D is an illustration of the exemplary single piston 125 at bottom dead center (BDC) according to various embodiments of the present technology. FIG. 1D again shows the single piston 125 at BDC with exhaust valve 110 open. Exhaust valve 110 remains open until single piston 125 reaches approximately TDC with venting of spent $CO_2$ out of exhaust valve 110 that is open.

FIG. 2A through FIG. 2D show a sequence of operation of two pairs of pistons functioning together by reciprocating in a linear oscillating manner in pairs for any even number cylinder engine that includes pairs of pistons according to various embodiments of the present technology. In various embodiments the operation of any pairs of pistons in a cylinder engine is shown in FIG. 2A to FIG. 2B to FIG. 2C to FIG. 2D. FIG. 2A through FIG. 2D show left piston 205 paired with right piston 220 and middle-left piston 210 paired with middle-right piston 215. In various embodiments the operation of two pairs of pistons (e.g., left piston 205 paired with right piston 220, and middle-left piston 210 paired with middle-right piston 215) reciprocate in pairs for an even number cylinder engine, the pistons repeat in sequence from FIG. 2A to FIG. 2B to FIG. 2C to FIG. 2D and again to FIG. 2A to FIG. 2B to FIG. 2C to FIG. 2D, and so forth.

FIG. 2A is an illustration of exemplary pistons reciprocating in a linear oscillating manner in pairs according to various embodiments of the present technology. FIG. 2A shows left piston 205 paired with right piston 220 with both left piston 205 and right piston 220 approaching TDC, with left piston 205 venting out valve 305 and right piston 220 venting out valve 340. Simultaneously, middle-left piston 210 paired with middle-right piston 215 (i.e., the reciprocating pair of pistons) are approaching BDC and the crankshaft centerline 225 under positive pressure caused by an injector (e.g., injector 115 of FIG. 1A and FIG. 1C) injecting expanding $CO_2$ through a superheating nozzle region (e.g., nozzle region 120 of FIG. 1A and FIG. 1C). Again, in various embodiments the superheating nozzle region (e.g., nozzle region 120 of FIG. 1A and FIG. 1C) may be an entire region beyond the injector (e.g., injector 115 of FIG. 1A and FIG. 1C), where intense heat is imparted into the scCO$_2$, and may include any part of, or entirety of the Clearance Volume (CV) that may be the former combustion chamber of a hydrocarbon fuel burning ICE. FIG. 2A further shows valve 310, valve 315, valve 320, valve 325, valve 330, and valve 335 closed.

FIG. 2B is another illustration of exemplary pistons reciprocating in a linear oscillating manner in pairs according to various embodiments of the present technology. FIG. 2B shows middle-left piston 210 paired with middle-right piston 215 that are approaching TDC, with middle-left piston 210 venting out valve 315 and middle-right piston 215 venting out valve 330. Simultaneously, left piston 205 paired with right piston 220 (i.e., the reciprocating pair of pistons) are approaching BDC and the crankshaft centerline 225 under positive pressure caused by an injector (e.g., injector 115 of FIG. 1A and FIG. 1C) injecting expanding CO$_2$ through a superheating nozzle region (e.g., nozzle region 120 of FIG. 1A and FIG. 1C). Again, in various embodiments the superheating nozzle region (e.g., nozzle region 120 of FIG. 1A and FIG. 1C) may be an entire region beyond the injector (e.g., injector 115 of FIG. 1A and FIG. 1C), where intense heat is imparted into the scCO$_2$, and may include any part of, or entirety of the Clearance Volume (CV) that may be the former combustion chamber of a hydrocarbon fuel burning ICE. FIG. 2B further shows valve 305, valve 310, valve 320, valve 325, valve 335, and valve 340 closed.

FIG. 2C is an illustration of exemplary pistons reciprocating in a linear oscillating manner in pairs according to various embodiments of the present technology. FIG. 2C shows left piston 205 paired with right piston 220 that are approaching TDC, with left piston 205 venting out valve 310 and right piston 220 venting out valve 335. Simultaneously, middle-left piston 210 paired with middle-right piston 215 (i.e., the reciprocating pair of pistons) are approaching BDC and the crankshaft centerline 225 under positive pressure caused by an injector (e.g., injector 115 of FIG. 1A and FIG. 1C) injecting expanding CO$_2$ through a superheating nozzle region (e.g., nozzle region 120 of FIG. 1A and FIG. 1C). Again, in various embodiments the superheating nozzle region (e.g., nozzle region 120 of FIG. 1A and FIG. 1C) may be an entire region beyond the injector (e.g., injector 115 of FIG. 1A and FIG. 1C), where intense heat is imparted into the scCO$_2$, and may include any part of, or entirety of the Clearance Volume (CV) that may be the former combustion chamber of a hydrocarbon fuel burning ICE. FIG. 2C further shows valve 305, valve 315, valve 320, valve 325, valve 330 and valve 340 closed.

FIG. 2D is another illustration of exemplary pistons reciprocating in a linear oscillating manner in pairs according to various embodiments of the present technology. FIG. 2D shows middle-left piston 210 paired with middle-right piston 215 that are approaching TDC, with middle-left piston 210 venting out valve 320 and middle-right piston 215 venting out valve 325. Simultaneously, left piston 205 paired with right piston 220 (i.e., the reciprocating pair of pistons) are approaching BDC and the crankshaft centerline 225 under positive pressure caused by an injector (e.g., injector 115 of FIG. 1A and FIG. 1C) injecting expanding CO$_2$ through a superheating nozzle region (e.g., nozzle region 120 of FIG. 1A and FIG. 1C). Again, in various embodiments the superheating nozzle region (e.g., nozzle region 120 of FIG. 1A and FIG. 1C) may be an entire region beyond the injector (e.g., injector 115 of FIG. 1A and FIG. 1C), where intense heat is imparted into the scCO$_2$, and may include any part of, or entirety of the Clearance Volume (CV) that may be the former combustion chamber of a hydrocarbon fuel (e.g., gasoline, diesel, and the like) burning ICE. FIG. 2D further shows valve 305, valve 310, valve 315, valve 330, valve 335, and valve 340 closed.

Figure 3:
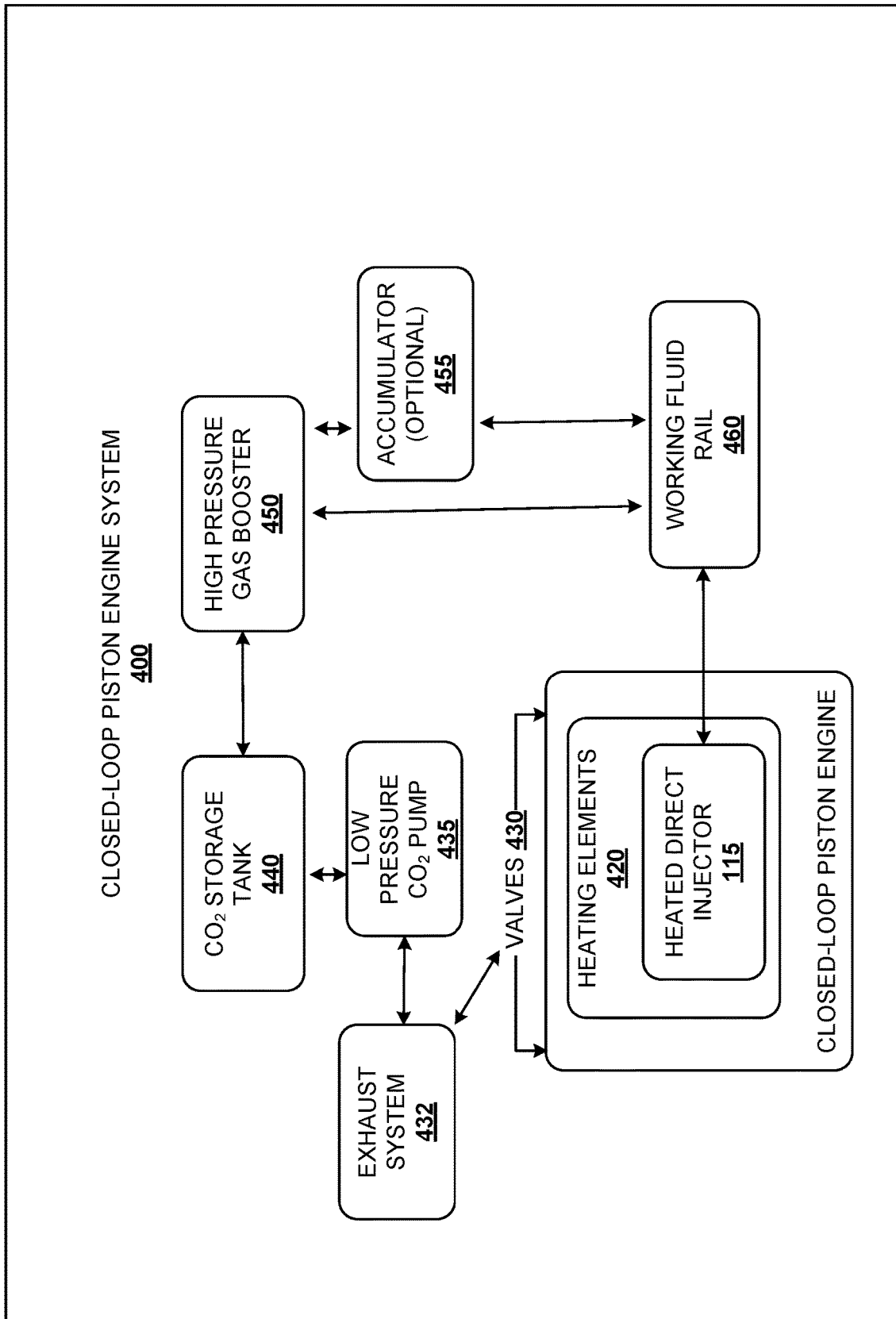
FIG. 3 shows a block diagram including elements of a closed-loop piston engine system using a recirculating carbon dioxide ($CO_2$) system with supercritical carbon dioxide ($scCO_2$) as a working fluid according to various embodiments of the present technology.

In various embodiments of the present technology, there is no combustion and no longer a need to draw air into the piston engine through the intake system and the intake valves for combustion, and the working gas scCO$_2$ is converted into a recirculating gas (CO$_2$) system including exhaust one (hereinafter "EX1") (e.g., exhaust valve 105 in FIG. 1A through FIG. 1D). The recirculating gas (CO$_2$) system is designed to meet or exceed the specifications of the original exhaust, including exhaust two (hereinafter "EX2") (e.g., exhaust valve 110 in FIG. 1A through FIG. 1D). In some instances, all hard piping, where practical are stainless steel or other suitable alloy to minimize potential corrosion issues. EX1 and EX2 (e.g., exhaust valve 105 and exhaust valve 110, respectively, in FIG. 1A through FIG. 1D) of the recirculating gas (CO$_2$) system are joined downstream of the cylinder exhaust ports combining the utilized CO$_2$, cooling and condensing the gas (CO$_2$) sufficiently, before feeding the gas (CO$_2$) into a relatively large volume, low pressure CO$_2$ pump (shown as low pressure CO$_2$ pump 435 in FIG. 3) optimized to system requirements. This lower-pressure pump directs compressed CO$_2$ into a storage tank (shown as CO$_2$ storage tank 440 in FIG. 3). Furthermore, the CO$_2$ from this storage tank (shown as CO$_2$ storage tank 440 in FIG. 3) is further compressed by a high-pressure gas booster (shown as high-pressure gas booster 450 in FIG. 3) or similar pump and fed to a "working fluid rail" (e.g., working fluid rail 460 as shown in FIG. 3) that is a common fuel rail in a gasoline or diesel engine. Moreover, an accumulator or high-pressure receiver (shown as accumulator 455 in FIG. 3) may be inserted inline prior to the "working fluid rail", to increase the available high pressure scCO$_2$, necessitated by maximum engine demands. For example, the recirculating carbon dioxide (CO$_2$) system may include a valve system (e.g., valves 430 shown in FIG. 3) fluidly coupled with the first valve of the cylinder head (e.g., exhaust valve 105 in FIG. 1A through FIG. 1D) and the second valve of the cylinder head (e.g., exhaust valve 110 in FIG. 1A through FIG. 1D) for collecting used carbon dioxide in a CO$_2$ storage tank (shown as CO$_2$ storage tank 440 in FIG. 3) receiving the used carbon dioxide via the valve system. The recirculating carbon dioxide (CO$_2$) system may further include a high-pressure gas booster (shown as high-pressure gas booster 450 in FIG. 3) fluidly coupled to the CO$_2$ storage tank (shown as CO$_2$ storage tank 440 in FIG. 3) for pressurizing the used carbon dioxide to a supercritical state producing scCO$_2$; and a working fluid rail (shown as working fluid rail 460 in FIG. 3) fluidly connecting the scCO$_2$ to the scCO$_2$ injector.

In various embodiments the valve retiming facilitates the two-stroke cycle required by some embodiments, as opposed to the four-stroke cycle required by an ICE. In a regular four-stroke, the shape of the lobes (not shown) on the camshaft determines how fast the valve opens, how high the valve opens, how long the valve remains open (called duration), but not when the valve opens. For example, "when" is controlled by the mechanical positioning of the camshaft relative to the piston position and is coordinated with the use of a timing belt/chain/gear system (not shown) as would already have been used in most ICE's. Nothing in this embodiment precludes the use of pneumatic, piezoelectric, or solenoid (or other) actuated valves, whether individual, paired or otherwise mechanically operated valves, in place of camshaft controlled valves. For example, continuing with the exemplary camshaft model, in a twin-cam (inline engine) or quad-cam (Vee engine), the EX2 camshaft (s) may be able to remain in their original positions relative to the crankshaft, and will open the exhaust valves on the original exhaust stroke (not shown). This is desirable for this engine. The original intake camshaft is referenced as the exhaust one camshaft (hereinafter "EX1 Cam"), and may be physically removed from the cylinder head, and rotated relative to the exhaust two camshaft (hereinafter EX2 Cam), so as to facilitate the opening of the EX1 valves when the original ICE would be on its compression stroke (the upstroke from BDC), with the piston moving away from the crankshaft centerline (e.g., crankshaft centerline 225 of FIG. 2A through FIG. 2D).

In various embodiments, since the original intake camshaft opened the original intake valves for a duration of approximately one piston stroke (towards the crankshaft centerline on the intake stroke), the original intake camshaft (EX1 Cam), may be rotated so the original intake valves open when the original four-stroke ICE engine cylinder/piston would be on the original compression stroke, where the piston, like on an original exhaust stroke, is moving away from the crankshaft centerline. Thus, by holding open the original intake valves on the upstroke, the original intake can now be utilized as an exhaust, (e.g., EX1).

In various embodiments of the present technology for an even number cylinder engine, pistons move (closer to, and farther from the crankshaft centerline) in pairs for engine balance purposes. In a regular ICE, only one of the pistons in the pair is on the power stroke as the two pistons approach the crankshaft, the other one is on the intake stroke producing no power. The present technology enables both pistons in the pair to be on the power stroke together, and are on the power stroke every second stroke, as would be the case in a typical two-cycle, rather than on every fourth stroke, as would apply to a four-cycle engine. The two-stroke embodiment for each cylinder: Power, Exhaust, repeating. The four-stroke: Intake, Compression, Power, Exhaust, repeating. For example, FIG. 2A through FIG. 2D show a sequence of operation of two pairs of pistons functioning together by reciprocating in a linear oscillating manner in pairs for any even number cylinder engine that includes pairs of pistons according to various embodiments of the present technology as described above. For example, the sequence is as follows FIG. 2A to FIG. 2B to FIG. 2C to FIG. 2D showing a sequence of operation of two pairs of pistons functioning together by reciprocating in a linear oscillating manner in pairs) as described above.

In various embodiments of the present technology there are no carbon emissions produced due to two facts. One, no fuel is burned. And two, it is a closed-loop system using a properly heated recirculating working fluid (e.g., $scCO_2$) including a recirculating $CO_2$ system described herein, instead of fuel. Externally supplied electricity, sourced from a battery or capacitor bank, may provide the necessary power for heating.

In some embodiments there is a need for rapid gas expansion and a large quantity of heat must be directed to the immediate vicinity of the injected working fluid (e.g., $scCO_2$) to optimize and control the pressures in the engine cylinders, and therefore the power output. The optimal direct injector/heater combination for the present technology is not addressed beyond expressing that a designer of such should endeavor to cause the injected $scCO_2$ to expand as rapidly as practically possible within the physical constraints of the engine. This puts the largest commensurate force on the piston and torque to the crankshaft. Again, in various embodiments the superheating nozzle region (e.g., nozzle region 120 of FIG. 1A and FIG. 1C) may be an entire region beyond the injector (e.g., injector 115 of FIG. 1A and FIG. 1C), where intense heat is imparted into the $scCO_2$, and may include any part of, or entirety of the Clearance Volume (CV) that may be the former combustion chamber of a hydrocarbon fuel burning ICE.

In various embodiments the present technology is a $CO_2$ reducing apparatus that may be used for "carbon credit" purposes. In some instances, custom camshafts may be used to optimize gas flow in and out of the cylinders. Any orientation of camshaft lobe, facilitating the functioning of what was originally a four-stroke design engine, into a two-stroke configuration is described in various embodiments of the present technology.

In various embodiments of the present technology an advantage is the reduction of frictional losses associated with the filling and emptying of the cylinder (now shown), (contributing to about forty percent of all engine friction losses according to "Ricardo"—the High Speed Internal Combustion Engine). For example, since there is no compression stroke, those associated losses are eliminated. For instance, maximum piston speed in a typical two-stroke is two-thousand ft/min before losing the ability to flow more air, while a four-stroke piston speed maxes out at about twenty-five hundred ft/min. Various embodiments of the present technology, described as a two-stroke, take advantage of these associated four-stroke flow rate advantages. Three-cylinder engines and five-cylinder engines do not have pairs of pistons moving together, and therefore do not benefit from two pistons being on the power stroke at the same time but do benefit from the two-stroke cycle characteristics described herein.

In various embodiments of the present technology overall $CO_2$ emissions are reduced globally because the present technology eliminates $CO_2$ emissions from piston engines equipped with this technology in contrast with other internal combustion engines (ICE's) that need a hydrocarbon fuel (e.g., diesel, gasoline, CNG, alcohol, and the like). Furthermore, the present technology also eliminates oxides of nitrogen. Furthermore, in some embodiments, the present technology satisfies government emissions reduction demands and/or requirements.

In embodiments of the present technology, hydrocarbon fuel burning ICEs may be converted using the present technology to produce zero emissions, accomplished by eliminating the need for combustion by replacing the combustion gas expansion pressure (force exerted on a piston) with $scCO_2$ gas expansion pressure (force exerted on a piston). For example, there are no emissions in embodiments of the present technology as the $CO_2$ is recirculated in a closed-loop system. As disclosed herein, removing the necessity for the engine to in-take oxygen for combustion (i.e., "breathe") creates an opportunity to use the previously required intake-stroke in a hydrocarbon fuel powered ICE as a power-stroke, thereby producing two power-strokes for every single power-stroke the same engine would produce if run as a hydrocarbon fuel powered ICE.

FIG. 3 shows a block diagram including elements of a closed-loop piston engine system 400 using a recirculating carbon dioxide ($CO_2$) system with supercritical carbon dioxide ($scCO_2$) as a working fluid according to various embodiments of the present technology. FIG. 3 shows the closed-loop piston engine system 400 using a recirculating carbon dioxide ($CO_2$) system with supercritical carbon dioxide ($scCO_2$) as a working fluid. For example, the closed-loop piston engine system 400 may comprise: a scCO$_2$ injector (e.g., heated direct injector 115) for injecting scCO$_2$ into a cylinder (not shown in FIG. 3, shown in nozzle region 120 of FIG. 1A and FIG. 1C) including heating elements 420; a superheating nozzle region for imparting heat into the injected scCO$_2$ (not shown in FIG. 3, shown as superheating occurs at nozzle region 120 in FIG. 1A and FIG. 1C); a first valve of a cylinder head of the cylinder, the first valve (not shown in FIG. 3, shown as exhaust valve 105 in FIG. 1A through FIG. 1D) being fluidly coupled with the recirculating carbon dioxide (CO$_2$) system; a second valve (not shown in FIG. 3, shown as exhaust valve 110 in FIG. 1A through FIG. 1D) of the cylinder head of the cylinder, the second valve being fluidly coupled with the recirculating carbon dioxide (CO$_2$) system; a piston moving in the cylinder and coupled with a crankshaft (not shown in FIG. 3, shown as crankshaft centerline 225 of FIG. 2A through FIG. 2D), the piston being driven toward a centerline of the crankshaft during a power stroke using a connecting rod and causing the crankshaft to rotate thereby causing one power stroke per crankshaft rotation and thereby producing two power strokes for every single power stroke as being powered in a hydrocarbon fuel internal combustion engine. Furthermore, the closed-loop piston engine system 400 may comprise: the recirculating carbon dioxide (CO$_2$) system comprising: a valve system (e.g., valves 430) fluidly coupled with the first valve of the cylinder head (not shown in FIG. 3, shown as exhaust valve 105 in FIG. 1A through FIG. 1D) and the second valve of the cylinder head (not shown in FIG. 3, shown as exhaust valve 110 in FIG. 1A through FIG. 1D) for collecting used carbon dioxide; an exhaust system 432; a low pressure CO$_2$ pump 435; a CO$_2$ storage tank 440 receiving the used carbon dioxide via the valve system (e.g., valves 430) and the low pressure CO$_2$ pump 435; a high-pressure gas booster 450 fluidly coupled to the CO$_2$ storage tank for pressurizing the used carbon dioxide to a supercritical state producing scCO$_2$; and a working fluid rail 460 fluidly connecting the scCO$_2$ to the scCO$_2$ injector, received from the high-pressure gas booster 450 or the accumulator 455 (optional).

While this technology is susceptible of embodiments in many different forms, there is shown in the drawings and has been described in detail several specific embodiments with the understanding that the present disclosure is to be considered as an exemplification of the principles of the technology and is not intended to limit the technology to the embodiments illustrated. Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof. Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three-dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein. Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below", or "beneath" other elements would then be oriented "above" the other elements. Therefore, the example terms "below" and "lower" can, therefore, encompass both an orientation of above and below.

The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated. While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments.

It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A closed-loop piston engine system using a recirculating carbon dioxide ($CO_2$) system with supercritical carbon dioxide ($scCO_2$) as a working fluid, the closed-loop piston engine system comprising:
   a $scCO_2$ injector for injecting $scCO_2$ into a cylinder;
   a superheating nozzle region for imparting heat into the injected $scCO_2$;
   a first valve of a cylinder head of the cylinder, the first valve being fluidly coupled with the recirculating carbon dioxide ($CO_2$) system;
   a second valve of the cylinder head of the cylinder, the second valve being fluidly coupled with the recirculating carbon dioxide ($CO_2$) system;
   a piston moving in the cylinder and coupled with a crankshaft, the piston being driven toward a centerline of the crankshaft during a power stroke using a connecting rod and causing the crankshaft to rotate thereby causing one power stroke per crankshaft rotation and thereby producing two power strokes for every single power stroke as being powered in a four-stroke hydrocarbon fuel internal combustion engine.

2. The closed-loop piston engine system of claim 1, wherein the closed-loop piston engine system using the recirculating carbon dioxide ($CO_2$) system with supercritical carbon dioxide ($scCO_2$) as the working fluid is a reconfigured four-stroke hydrocarbon internal combustion engine; and
   wherein the $scCO_2$ injector for injecting $scCO_2$ into a cylinder is a heated direct injector located in a spark plug hole location of the reconfigured four-stroke hydrocarbon internal combustion engine.

3. The closed-loop piston engine system of claim 1, wherein the closed-loop piston engine system using the recirculating carbon dioxide ($CO_2$) system with supercritical carbon dioxide ($scCO_2$) as the working fluid is a reconfigured four-stroke hydrocarbon internal combustion engine; and
   wherein the superheating nozzle region for imparting heat into the injected $scCO_2$ is a region beyond the $scCO_2$ injector, the region beyond the $scCO_2$ injector being where intense heat is imparted into the $scCO_2$ including a Clearance Volume (CV) of a combustion chamber of the reconfigured four-stroke hydrocarbon internal combustion engine.

4. The closed-loop piston engine system of claim 1, wherein the closed-loop piston engine system using the recirculating carbon dioxide ($CO_2$) system with supercritical carbon dioxide ($scCO_2$) as the working fluid is a reconfigured four-stroke hydrocarbon internal combustion engine;
   wherein the first valve of the cylinder head fluidly coupled with the recirculating carbon dioxide ($CO_2$) system includes an intake valve of the reconfigured four-stroke hydrocarbon internal combustion engine; and
   wherein the second valve of the cylinder head fluidly coupled with the recirculating carbon dioxide ($CO_2$) system includes an exhaust valve of the reconfigured four-stroke hydrocarbon internal combustion engine.

5. A closed-loop piston engine system using a recirculating gas system with supercritical gas as a working fluid, the closed-loop piston engine system comprising:
   a supercritical gas injector for injecting the supercritical gas into a cylinder;
   a superheating nozzle region for imparting heat into the injected supercritical gas;
   a first valve of a cylinder head of the cylinder, the first valve being fluidly coupled with the recirculating gas system;
   a second valve of the cylinder head of the cylinder, the second valve being fluidly coupled with the recirculating gas system;
   a piston moving in the cylinder and coupled with a crankshaft, the piston being driven toward a centerline of the crankshaft during a power stroke using a connecting rod and causing the crankshaft to rotate thereby causing one power stroke per crankshaft rotation and thereby producing two power strokes for every single power stroke as being powered in a four-stroke hydrocarbon fuel internal combustion engine.

6. The closed-loop piston engine system of claim 5, wherein the closed-loop piston engine system using the recirculating gas system with the supercritical gas as the working fluid is a reconfigured four-stroke hydrocarbon internal combustion engine; and
   wherein the supercritical gas injector for injecting the supercritical gas into a cylinder is a heated direct injector located in a spark plug hole location of the reconfigured four-stroke hydrocarbon internal combustion engine.

7. The closed-loop piston engine system of claim 5, wherein the closed-loop piston engine system using the recirculating gas system with the supercritical gas as the working fluid is a reconfigured four-stroke hydrocarbon internal combustion engine; and
   wherein the superheating nozzle region for imparting heat into the injected supercritical gas is a region beyond the supercritical gas injector, the region beyond the supercritical gas injector being where intense heat is imparted into the supercritical gas including a Clearance Volume (CV) of a combustion chamber of the reconfigured four-stroke hydrocarbon internal combustion engine.

8. The closed-loop piston engine system of claim 5, wherein the closed-loop piston engine system using the recirculating gas system with the supercritical gas as the working fluid is a reconfigured four-stroke hydrocarbon internal combustion engine;
  wherein the first valve of the cylinder head fluidly coupled with the recirculating gas system includes an intake valve of the reconfigured four-stroke hydrocarbon internal combustion engine; and
  wherein the second valve of the cylinder head fluidly coupled with the recirculating gas system includes an exhaust valve of the reconfigured four-stroke hydrocarbon internal combustion engine.

9. A closed-loop piston engine system using a recirculating carbon dioxide ($CO_2$) system with supercritical carbon dioxide ($scCO_2$) as a working fluid, the closed-loop piston engine system comprising:
  a scCO2 injector for injecting scCO2 into a first cylinder of a plurality of cylinders;
  a superheating nozzle region for imparting heat into the injected $scCO_2$;
  a first valve of a cylinder head of the first cylinder, the first valve being fluidly coupled with the recirculating carbon dioxide ($CO_2$) system;
  a second valve of the cylinder head of the first cylinder, the second valve being fluidly coupled with the recirculating carbon dioxide ($CO_2$) system;
  a plurality of pistons each coupled with a crankshaft, the plurality of pistons each being driven toward a centerline of the crankshaft during a power stroke using a connecting rod and causing the crankshaft to rotate thereby causing one power stroke per crankshaft rotation and thereby producing two power strokes for every single power stroke as being powered in a four-stroke hydrocarbon fuel internal combustion engine.

10. The closed-loop piston engine system of claim 9, wherein the closed-loop piston engine system using the recirculating carbon dioxide ($CO_2$) system with supercritical carbon dioxide ($scCO_2$) as the working fluid is a reconfigured four-stroke hydrocarbon internal combustion engine; and
  wherein the $scCO_2$ injector for injecting $scCO_2$ into a cylinder is a heated direct injector located in a spark plug hole location of the reconfigured four-stroke hydrocarbon internal combustion engine.

11. The closed-loop piston engine system of claim 9, wherein the closed-loop piston engine system using the recirculating carbon dioxide ($CO_2$) system with supercritical carbon dioxide ($scCO_2$) as the working fluid is a reconfigured four-stroke hydrocarbon internal combustion engine; and
  wherein the superheating nozzle region for imparting heat into the injected $scCO_2$ is a region beyond the $scCO_2$ injector, the region beyond a point of $scCO_2$ injection being where intense heat is imparted into the $scCO_2$ including a Clearance Volume (CV) of a combustion chamber of the reconfigured four-stroke hydrocarbon internal combustion engine.

12. The closed-loop piston engine system of claim 9, wherein the closed-loop piston engine system using the recirculating carbon dioxide ($CO_2$) system with supercritical carbon dioxide ($scCO_2$) as the working fluid is a reconfigured four-stroke hydrocarbon internal combustion engine;
  wherein the first valve fluidly coupled with the recirculating carbon dioxide ($CO_2$) system includes an intake valve of the reconfigured four-stroke hydrocarbon internal combustion engine; and
  wherein the second valve fluidly coupled with the recirculating carbon dioxide ($CO_2$) system includes an exhaust valve of the reconfigured four-stroke hydrocarbon internal combustion engine.

13. The closed-loop piston engine system of claim 9, wherein the plurality of pistons include pairs of pistons functioning together by reciprocating in a linear oscillating manner in pairs, the pairs of pistons being on a power stroke at a same time thereby causing one power stroke per piston per crankshaft rotation thereby producing two power strokes for every single power stroke as being powered in a four-stroke hydrocarbon fuel internal combustion engine.

14. A closed-loop piston engine system using a recirculating gas system with supercritical gas as a working fluid, the closed-loop piston engine system comprising:
  a supercritical gas injector for injecting the supercritical gas into a first cylinder, of a plurality of cylinders;
  a superheating nozzle region for imparting heat into the injected supercritical gas;
  a first valve of a cylinder head of the first cylinder, the first valve being fluidly coupled with the recirculating gas system;
  a second valve of the cylinder head of the first cylinder, the second valve being fluidly coupled with the recirculating gas system;
  a plurality of pistons each coupled with a crankshaft, the plurality of pistons being driven toward a centerline of the crankshaft during a power stroke using a connecting rod and causing the crankshaft to rotate thereby causing one power stroke per crankshaft rotation and thereby producing two power strokes for every single power stroke as being powered in a four-stroke hydrocarbon fuel internal combustion engine.

15. The closed-loop piston engine system of claim 14, wherein the closed-loop piston engine system using the recirculating gas system with the supercritical gas as the working fluid is a reconfigured four-stroke hydrocarbon internal combustion engine; and
  wherein the supercritical gas injector for injecting the supercritical gas into a cylinder is a heated direct injector located in a spark plug hole location of the reconfigured four-stroke hydrocarbon internal combustion engine.

* * * * *